US008874166B2

(12) United States Patent
Thoresson (10) Patent No.: US 8,874,166 B2
(45) Date of Patent: Oct. 28, 2014

(54) COMMUNICATION TERMINALS WITH PULL-BASED DIGITAL INFORMATION DISTRIBUTION CAPABILITY AND PULL-BASED METHODS FOR DIGITAL INFORMATION DISTRIBUTION (71) Applicants: Sony Mobile Communications AB, Lund (SE); Sony Corporation, Tokyo (JP)

(72) Inventor: Johan Thoresson, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

(21) Appl. No.: 14/284,102

(22) Filed: May 21, 2014

(65) Prior Publication Data
US 2014/0256296 A1 Sep. 11, 2014

Related U.S. Application Data (62) Division of application No. 11/209,436, filed on Aug. 23, 2005, now Pat. No. 8,787,967.

(51) Int. Cl.
H04M 1/00 (2006.01)
H04W 4/12 (2009.01)
(52) U.S. Cl.
CPC ..................................... *H04W 4/12* (2013.01)
USPC .................................................... 455/556.1
(58) Field of Classification Search
USPC ...................................................... 455/556.1
See application file for complete search history.

(56) References Cited

U.S. PATENT DOCUMENTS

| 5,973,685 | A | * | 10/1999 | Schaffa et al. ................. 715/722 |
| 6,011,537 | A | * | 1/2000 | Slotznick ....................... 715/733 |
| 6,016,478 | A | * | 1/2000 | Zhang et al. .................. 705/7.19 |
| 7,280,843 | B2 | * | 10/2007 | Lection et al. ............. 455/556.1 |
| 2002/0181586 | A1 | * | 12/2002 | Kondo et al. ............. 375/240.08 |
| 2004/0068481 | A1 | * | 4/2004 | Seshadri et al. .................. 707/1 |

(Continued)

FOREIGN PATENT DOCUMENTS

CN 1538351 10/2004
JP 2002-55687 A 2/2002

(Continued)

OTHER PUBLICATIONS

International Search Report and Written Opinion of the International Searching Authority for corresponding PCT Application No. PCT/EP2006/065554, mailed Oct. 9, 2006.

(Continued)

Primary Examiner — Ankur Jain
(74) Attorney, Agent, or Firm — Myers Bigel Sibley & Sajovec, PA (57) ABSTRACT Wireless communication terminals include a memory, a wireless communication module configured to communicate with other communication terminals over a wireless interface, and a controller that is configured to store a digital information signal in the memory and to receive a distribution command from a user of the wireless communication terminal. The controller is further configured, responsive to receiving the distribution command, to send a share notification signal through the wireless communication module to a remotely located other communication terminal, and, responsive to receiving an access request from the other communication terminal, to send the digital information signal to the other communication terminal. Method embodiments are also disclosed.

7 Claims, 4 Drawing Sheets (56) References Cited

U.S. PATENT DOCUMENTS

2004/0255031 A1* 12/2004 Nomura et al. ............... 709/228
2005/0044147 A1*  2/2005 Yap ............................... 709/205
2005/0257052 A1* 11/2005 Asai et al. ..................... 713/166

FOREIGN PATENT DOCUMENTS

JP          2002-142203 A    5/2002
JP          2002-352095 A    12/2002
JP          2004-129205 A    4/2004

OTHER PUBLICATIONS

Office Action for corresponding Chinese Patent Application No. 200680030567.7; Dated May 27, 2010; 12 pages.
Office Action for corresponding Japanese Patent Application No, 2008-526511; Dated Jun. 11, 2010; 3 pages.

* cited by examiner

FIGURE 1 ently relate to apparatus and methods that

COMMUNICATION TERMINALS WITH PULL-BASED DIGITAL INFORMATION DISTRIBUTION CAPABILITY AND PULL-BASED METHODS FOR DIGITAL INFORMATION DISTRIBUTION

CROSS-REFERENCE TO RELATED APPLICATION

This application is a divisional application of U.S. patent application Ser. No. 11/209,436, filed on Aug. 23, 2005, the contents of which are hereby incorporated by reference as if recited in full herein.

FIELD OF THE INVENTION

The present invention generally relates to the field of communications, and more particularly to apparatus and methods for distributing digital information using wireless telephony.

BACKGROUND

Wireless communication terminals have evolved to include increasingly more functionality. For example, some wireless communication terminals are capable of generating, acquiring, storing, processing, displaying and/or playing various kinds of digital data signals. Such digital data signals may include, for example, audio signals such as voice, music or other audio signals, still image signals, and/or video data signals (which may or may not include accompanying digital audio signals). In addition to storing, displaying and/or playing such data signals, users of appropriately configured communication terminals may also desire to share such digital data signals with other users. Thus, system operators have implemented services such as wireless email and MMS to permit users to share digital data stored on a wireless terminal.

In a conventional system for sharing digital data using wireless terminals, a user of a first wireless communication terminal (the "originating user") stores a digital data signal, such as, for example, a digitized still image. The user may then send the digitized still image to a remote second wireless communication terminal (the "receiving user"), or to a group of remote second wireless communication terminals (for example, wireless communication terminals listed in a distribution list stored in the first wireless communication terminal). The second wireless communication terminal may receive the data signal from the first wireless communication terminal and play and/or display the data signal based on commands from the receiving user. Such systems are commonly referred to as "push-based" systems, because they rely on the first user to "push" the data signal to the remote user based on an assumption by the first user that the second user desires to receive the data signal.

According to other known systems, an originating user may post a digital data signal, such as a digital still image, to a remote database and send a notification signal to a receiving user notifying the receiving user that the digital data signal is available for retrieval from the database. The receiving user may then access the remote database and download the digital data signal. Such a system may be generally referred to as a "post-based" system, since the digital data signal is posted to a remote database and subsequently received by a receiving user.

Conventional systems such as those described above may suffer from a number of drawbacks, however. For example, in push-based systems, the originating user may be required to make an assumption as to the type of information the receiving user wishes to receive, and/or the format of such information. As a practical matter, in a communication system in which users are billed based on the time and/or bandwidth required to transmit a digital message or on a per-message basis, an originating user may be deterred from incurring the expense associated with sending a digital data signal to a remote user absent such a-priori knowledge.

Moreover, post-based systems may require the digital data signal to be stored at a remote location, which may be expensive, particularly for large data signals. In addition, for security purposes, such systems may require an extra layer of management protocols (for example, username and password sign-ons) which may make the process of retrieving stored information signals more time-consuming and inconvenient for the receiving user, thus decreasing the probability that the receiving user will utilize the wireless communication system to retrieve the digital data signal. Accordingly, efficiently utilizing a wireless communication interface to share digital information continues to be a challenge.

SUMMARY

Some embodiments of the invention provide a wireless communication terminal including a memory, a wireless communication module that is configured to communicate with other communication terminals over a wireless interface, and a controller that is configured to store a digital information signal in the memory and to receive a distribution command from a user of the wireless communication terminal, and, responsive to receiving the distribution command, to send a share notification signal through the wireless communication module to a remotely located other communication terminal, and, responsive to receiving an access request from the other communication terminal, to send the digital information signal to the other communication terminal.

In some embodiments, the communication terminal may further include a digital camera configured to generate a digital image and/or a digital video stream, and the controller may be configured to store the generated digital image and/or digital video stream as the digital information signal in the memory.

In some embodiments, the controller may further include a database of addresses of other communication terminals, a plurality of the addresses corresponding to a predetermined distribution command, and the controller may be configured to send a share notification signal to the plurality of the addresses in response to the distribution command corresponding to the predetermined distribution command. The communication terminal may include a user interface configured to generate the distribution command responsive to a menu selection and/or actuation of a key.

According to further embodiments of the invention, the access request may be indicative of a format and/or signal requirement requested by the other communication terminal and the controller may be further configured to format the digital information signal responsive to the access request indicating a requested format and/or signal requirement. The specified requirement may be a signal size requirement, a resolution requirement, a signal quality requirement, an encoding requirement and/or another requirement.

In addition, the controller may be further configured to generate a truncated and/or reduced version of the digital information signal and to send the truncated and/or reduced version of the digital information signal along with the share notification signal.

Methods according to some embodiments of the invention include storing a digital information signal in a memory of the first wireless communication terminal; sending a notification signal from the first wireless communication terminal to the second wireless communication terminal, the notification signal indicating the availability of the digital information signal; receiving at the first wireless communication terminal a request signal from the second wireless communication terminal; and responsive to the request signal, sending the digital information signal from the first wireless communication terminal to the second wireless communication terminal.

In some embodiments, the notification signal may include a truncated and/or reduced version of the digital information signal, and the method may further include displaying/playing the truncated and/or reduced version of the digital information signal at the second wireless terminal.

In some embodiments, the notification signal may include an option for formatting the digital information signal at the first wireless communication terminal. The formatting option may include signal size, signal quality, resolution, compression, encoding and/or other options.

Further methods according to the invention may include processing the digital information signal pursuant to a formatting option specified in the request signal. Furthermore, sending the digital information signal to the second wireless communication terminal may include sending the processed digital information signal to the second wireless communication terminal.

Methods according to further embodiments of the invention include receiving a first notification signal at an intermediary from a first wireless communication terminal indicating the availability of a digital information signal and including an address of the second wireless communication terminal; responsive to the first notification signal from the first wireless communication terminal, sending a second notification signal from the intermediary to the second wireless communication terminal indicating the availability of the digital information signal; receiving a first request signal at the intermediary from the second wireless communication terminal; and responsive to the first request signal, sending a second request signal from the intermediary to the first wireless communication terminal requesting the first wireless communication terminal to send the digital information signal.

In some embodiments, the first notification signal may include a truncated and/or reduced version of the digital information signal, and the method may further include displaying/playing the truncated and/or reduced version of the digital information signal at the second wireless terminal. The first notification signal may further include a formatting option for the digital information signal.

In some embodiments, the second notification signal may include an option for formatting the digital information signal.

Methods according to the invention may further include receiving the digital information signal at the intermediary from the first wireless communication terminal and sending the digital information signal from the intermediary to the second wireless communication terminal.

Still further methods according to the invention may include processing the digital information signal at the intermediary pursuant to a formatting option specified in the first request signal. Further, sending the digital information signal to the second wireless communication terminal may include sending the formatted digital information signal to the second wireless communication terminal.

DETAILED DESCRIPTION OF EMBODIMENTS OF THE INVENTION

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. As used herein the term "comprising" or "comprises" is open-ended, and includes one or more stated elements, steps and/or functions without precluding one or more unstated elements, steps and/or functions. As used herein the term "and/or" includes any and all combinations of one or more of the associated listed items. As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

Embodiments according to the present invention are described with reference to block diagrams and/or operational illustrations of methods and communication terminals. It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, a "communication terminal" includes, but is not limited to, a terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a wireless local area network (WLAN), and/or another communication terminal. When the communication terminal is configured to communicate over a wireless interface, it is referred to herein as a "wireless communication terminal" and a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

Figure 1:
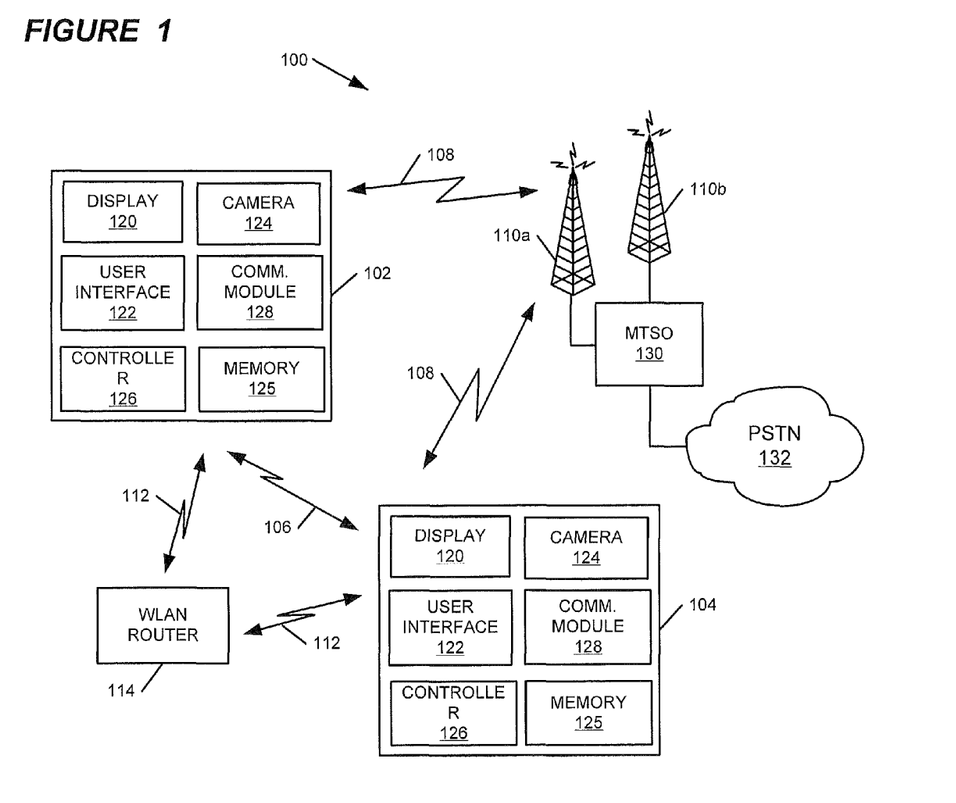
FIG. 1 is a schematic block diagram illustrating wireless communication terminals and a cellular communication system in accordance with some embodiments of the present invention.

FIG. 1 is a schematic block diagram of a wireless communication system 100 that includes two wireless terminals 102, 104 that are configured to communicate data with one another over a direct wireless communication interface 106 therebetween, over another wireless communication interface 108 through one or more cellular base stations 110a-b, and/or over another wireless communication interface 112 through a wireless local area network (WLAN) router 114. The wireless terminals 102, 104 include a display device 120, a user interface 122, a camera device 124, a controller 126, a communication module 128, and a memory 125.

The camera device 124 is configured to generate a still image and/or video data stream based on incident light. The user interface 122 can include a keypad, keyboard, touchpad, jog dial and/or other user input device. The user interface 122 can also include a microphone coupled to an audio processor that is configured to generate an audio data stream responsive to sound incident on the microphone, and a speaker that generates sound responsive to an input audio signal. The communication module 128 is configured to communicate data over one or more of the wireless interfaces 106, 108, and/or 112 to another remote wireless terminal 102, 104. The memory 125 is configured to store a digital information signal such as a digital audio and/or video signal generated by the camera device 124 and/or the microphone of the user interface 122.

The communication module 128 can include a cellular communication module, a Bluetooth module, and/or a WLAN module. With a cellular communication module, the wireless terminals 102, 104 can communicate via the base stations 110a-b using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base stations 110a-b are connected to a Mobile Telephone Switching Office (MTSO) 130 wireless network, which, in turn, is connected to a PSTN 132 and/or another network. With a Bluetooth module, the wireless terminal 102, 104 can communicate via an ad-hoc network through the direct interface 106. With a WLAN module, the wireless terminal 102, 104 can communicate through the WLAN router 114 using a communication protocol that may include, but is not limited to, 802.11a, 802.11b, 802.11e, 802.11g, 802.11i.

The wireless terminals 102, 104 are configured to transmit and/or receive a digital data signal between one another and/or with another communication terminal that may be communicatively coupled thereto through, for example the MTSO 130 and the PSTN 132 and/or another network.

In accordance with various embodiments of the present invention, methods of sharing digital information in a wireless communication network include storing a digital information signal in an originating wireless terminal 102, and sending a notification signal from the originating wireless terminal 102 to a receiving wireless terminal 104 indicating the existence and availability of the stored digital information signal for access by the receiving wireless terminal 104. Responsive to a request signal from the receiving wireless terminal 104, the originating wireless terminal 102 may then send the digital information signal to the receiving wireless terminal 104.

As will be discussed further below, the originating wireless terminal 402 may process the digital information signal based on options selected and/or requested by the receiving wireless terminal 104. For example, for video data, the originating wireless terminal 102 may vary the video resolution, video frame rate, compression rate, and/or quality of video that is transmitted to the receiving wireless terminal based on an indication sent by the receiving wireless communication terminal 104. Accordingly, the receiving wireless terminal 104 can coordinate with the originating wireless terminal 102 to optimize the amount of data that is used in the video data stream based on whether and/or how it is to be displayed, and they may thereby increase the efficiency with which they use the data bandwidth of the wireless interfaces 106, 108, and/or 112.

Figure 2:
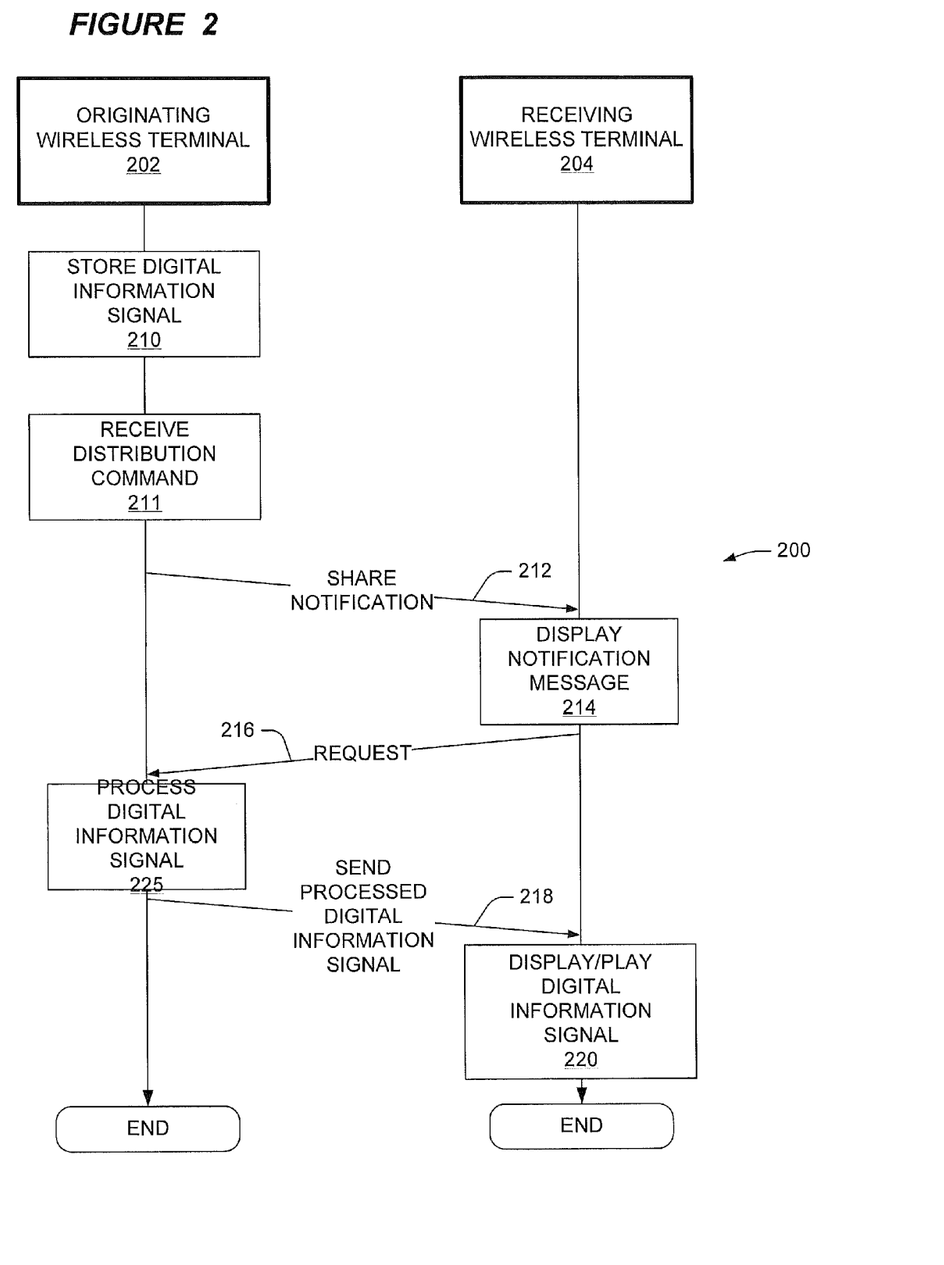
FIGS. 2-4 are flow diagrams illustrating operations according to some embodiments of the invention employing pull-based digital information distribution.
Figure 3:
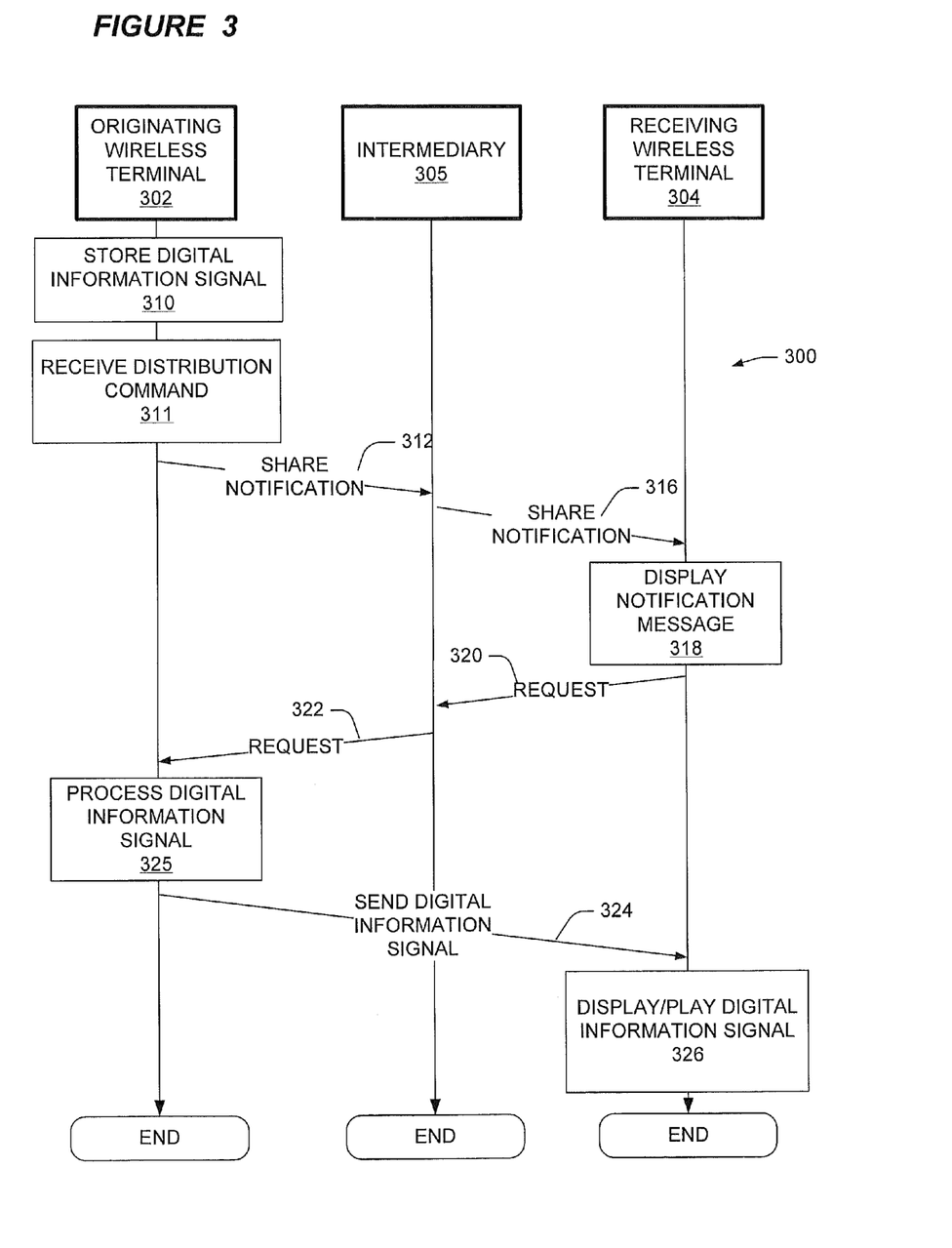
Figure 4:
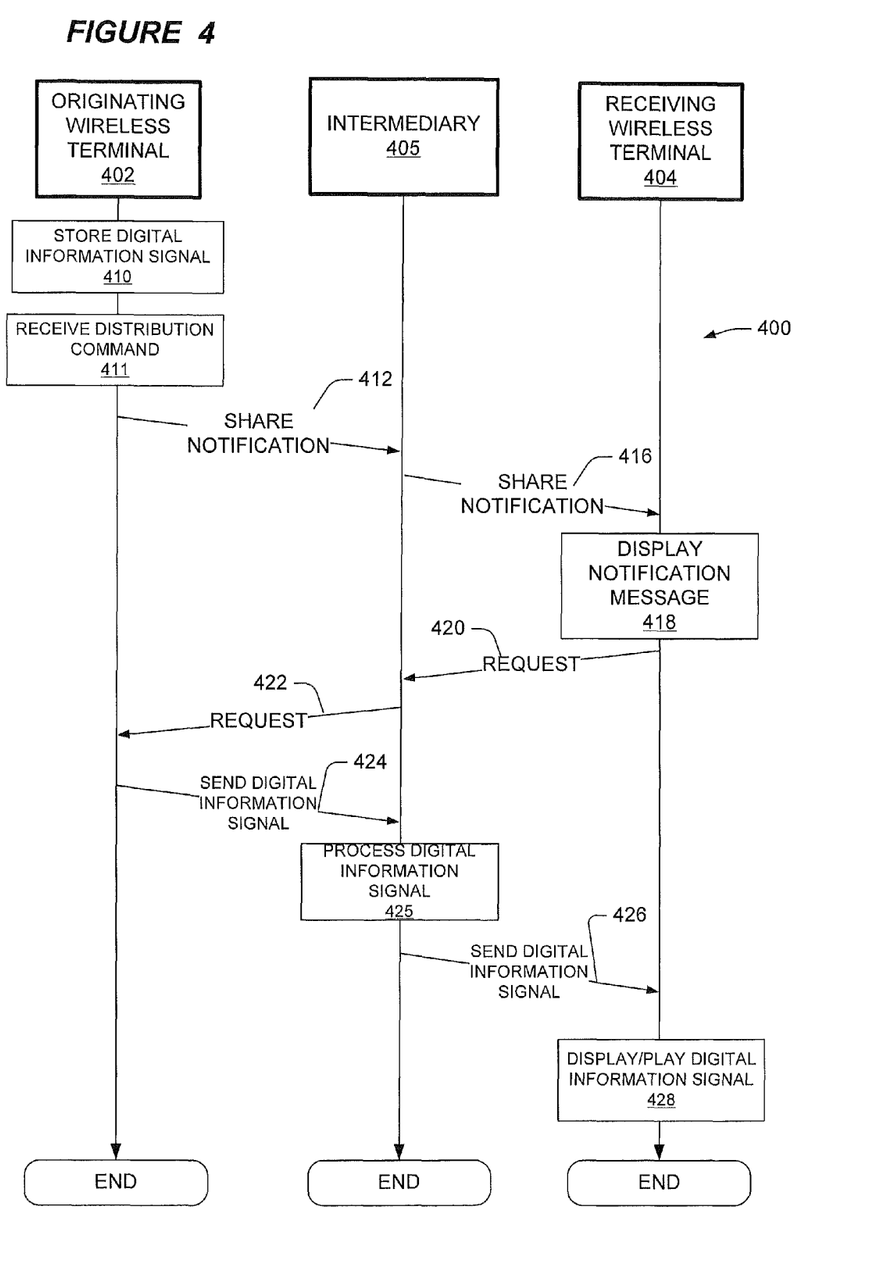

Exemplary embodiments will now be described with reference to the flow diagrams and associated methods illustrated in FIGS. 2, 3 and 4. FIG. 2 is a flow diagram illustrating steps performed in, and the flow of various signals and information between, an originating wireless terminal 202 and a receiving wireless terminal 204 in accordance with some embodiments of the invention. As discussed above, communication between the originating wireless terminal 202 and the receiving wireless terminal 204 may be accomplished via a direct interface such as a Bluetooth wireless RF connection or via an indirect interface, such as through a WLAN or cellular-based system. In FIGS. 2-4 messages flowing between originating and receiving wireless terminals are illustrated as flowing in a generally horizontal direction, while actions taken by the wireless communication terminals are indicated by boxes along the vertical axis.

Referring now to FIG. 2, an originating wireless terminal 202 stores a digital information signal in the memory 125 (block 210). The digital information signal may include an audio signal such as a voice, music or other audio signal, a still image signal, and/or a video data signal (which may or may not include an accompanying digital audio signal). Other digital information signals are possible. For example, an appropriately configured wireless communication terminal could store a signal indicative of an infrared image, UV information, temperature information, or any other digital information. The digital information signal may be generated by the originating wireless terminal 202. For example, a digital still image may be recorded by an integrated camera 124 within the originating wireless terminal 202, or an audio signal may be captured by an integrated microphone in the user interface 122 of the originating wireless terminal 202. Alternatively, the digital information signal may be generated outside the originating wireless terminal 202 and communicated to the originating wireless terminal 202. In either case, the result is that the originating wireless terminal 202 stores a digital information signal in the memory 125.

After storing the digital information signal, the user of the originating wireless terminal 202 may issue a distribution command (block 211) to the controller of the originating wireless terminal 202 instructing the originating wireless terminal 202 to share the digital information signal. The distribution command may be issued by means of a menu selection of a user interface of the originating wireless terminal 202. In some embodiments, the distribution command may be made by means of actuation of a "hard key" or a dedicated key of the originating wireless terminal 202. Alternatively, the sharing command could be issued implicitly, for example, by storing a file in a designated location, such as a "sharing" folder or by marking a file with a designated flag. In some embodiments, the distribution command may be issued before storing the digital information signal. For example, a user of the originating wireless terminal 202 may configure the originating wireless terminal 202 to share any digital information signal of a predetermined type (e.g. voice, image, video, etc.) with a predetermined recipient or group of recipients. For example, the originating wireless terminal 202 may be configured such that whenever a new digital still image is stored, a notification signal is sent to all wireless communication terminals 104 identified on a predetermined mailing list.

The distribution command may be associated by the originating wireless terminal 202 with a single recipient or with a group of recipients. In some embodiments, the originating wireless terminal 202 may include a database of addresses of other communication terminals. A given distribution command may be associated with a set or subset of such addresses such that when the distribution command is issued by the user of the originating communication terminal 202, the controller of originating wireless terminal 202 is instructed to share the digital information signal with all other communication terminals identified in the set or subset of addresses.

Upon receipt of the distribution command, the originating wireless terminal 202 sends a share notification signal 212 to the designated receiving wireless terminal 204 (or group of receiving wireless terminals 204) indicating to the receiving wireless terminal 204 that the digital information signal has been stored and is available for retrieval by the receiving wireless terminal 204.

The share notification signal 212 may include identifying and/or other information designed to permit the user of the second wireless terminal 204 to make a decision whether or not to retrieve the stored digital information signal. For example, the share notification signal 212 may include the identity of the user of the first wireless terminal 202, a text title and/or description of the digital information signal, and/or a file size. In addition, the share notification signal 212 may include a truncated and/or reduced version of the digital information signal. For example, where the digital information signal includes a digital still image or digital video signal, the share notification signal 212 may include a "thumbnail" image having a reduced size and/or signal quality. Where the digital information signal includes an audio signal, the share notification signal 212 may include shortened "clip" from the audio signal (e.g. the first n seconds of the audio signal or the like). The shortened clip of the audio signal may additionally be compressed to reduce its size. The truncated and/or reduced version of the digital information signal may be further compressed using, for example, a digital compression algorithm.

In addition, the share notification signal 212 may include information regarding options for retrieving the digital information signal. For example, the share notification signal 212 may indicate that the stored digital information signal is available for retrieval in a high, medium or low quality format, along with the estimated or actual file size for each format. For a video data signal, the quality of the signal may me determined by the video resolution (e.g., lines of video per frame, number of pixels, and/or size) and/or the video frame rate used to display the video data stream. For digital still images, the quality of the signal may depend on the size, compression ratio, resolution, color depth, and/or other properties of the image. For digital audio signals, the quality of the signal may be based on properties of the signal such as sampling rate, type of encoding (e.g. mu-law or A-law), compression ratio, and the like.

It will be appreciated that any combination of such options could be included in the share notification signal 212. For simplicity and ease of operation, however, it may be preferable to provide a limited number of choices in the share notification signal 212 (e.g. high, medium or low quality). Alternatively, the share notification signal could provide minimum and maximum ranges for one or more of the selected signal properties. In response, the receiving wireless terminal 204 could specify minimum values for the specified ranges, and permit the originating wireless terminal 202 to generate or select and transmit the digital information signal in a format that meets the minimum values specified by the receiving wireless terminal 204.

Returning to FIG. 2, the receiving wireless terminal 204 receives the share notification signal 212 and displays a notification message to the user of the receiving wireless terminal 204 (block 214). The notification message may indicate that a digital information signal is available for download. In addition, the notification message may indicate the identity of the originating user and the type of information signal that is available (e.g., image, audio or video). The notification message may further indicate the available formats and their respective file sizes and/or transmission times. If the user of the receiving wireless terminal 204 decides to retrieve the digital information signal, an appropriate command is given to the receiving wireless communication terminal 204 (e.g. via an appropriate keypress or menu selection) and the receiving wireless terminal 204 responsively sends a request signal 216 to the originating wireless terminal 202 identifying the desired digital information signal and requesting that the originating wireless terminal 202 send the signal.

As discussed above, the request signal 216 may include information responsive to options provided in the share notification signal. For example, the request signal may indicate the desired quality of the signal (low, medium or high), and any other retrieval options designated or supported by the originating wireless terminal 202.

In response to the request signal 216, the originating wireless terminal 202 may process the digital information signal to provide a formatted digital information signal conforming to the options specified by the receiving wireless terminal 204 (block 225). The originating wireless terminal 202 may then send the formatted digital information signal 218 to the receiving wireless terminal 204 in the format and/or with the options requested by the receiving wireless terminal 204 in the request signal 216. The receiving wireless terminal 204 may then display and/or play the signal for the user (block 220).

Referring to the embodiments illustrated in FIG. 3, a system 300 according to embodiments of the invention includes an originating wireless terminal 302, a receiving wireless terminal 304 and an intermediary 305 for coordinating share notifications and requests. The intermediary 305 may reside within the mobile telephone switching office 130. Alternatively, the intermediary 305 may reside external to the MTSO 130. For example, in some embodiments, the intermediary 305 may be a separate computer communicating with the MTSO via the public switched telephone network 132 or via a dedicated wired or wireless connection. The intermediary 305 may be a standalone computer server or may be implemented in software in a multipurpose computer server. In either case, the intermediary may be configured to communicate with both the originating wireless terminal 302 and the receiving wireless terminal 304 and to facilitate the process of sharing digital information signals among wireless terminals 302, 304. In some embodiments, the intermediary 305 may communicate with a billing server (not shown) in the MTSO to permit the intermediary 305 to determine an estimated charge for sending and/or receiving a particular digital information signal.

As illustrated in FIG. 3, an originating wireless terminal 302 stores a digital information signal (block 310). The digital information signal may include an audio signal such as a voice, music or other audio signal, a still image signal, and/or a video data signal (which may or may not include an accompanying digital audio signal). The digital information signal may be generated by the originating wireless terminal 302, or it may be generated outside the originating wireless terminal 302 and communicated to the originating wireless terminal 302.

After receiving a distribution command issued by the user of the originating wireless terminal 302, for example, by means of a menu selection or an appropriate keypress (block 311), the originating wireless terminal 302 sends an appropriate first share notification signal 312 to the intermediary 305 indicating that the digital information signal has been stored and is available for retrieval by the receiving wireless terminals 304 specified in the first share notification signal 312.

As described above, the originating wireless terminal 302 may be configured to automatically send a first share notification signal 312 identifying a selected receiving wireless terminal 304 or group of selected wireless communication terminals 104 based on the storage of a particular type of digital information signal.

The first share notification signal 312 includes an identification of one or more receiving wireless terminals 304 that the user of the originating wireless terminal desires to notify of the existence and availability of the stored digital information signal.

The first share notification signal 312 may additionally include identifying and/or other information designed to permit the user of a receiving wireless terminal 304 to make a decision whether or not to retrieve the stored digital information signal. In addition, the first share notification signal 312 may include a highly compressed and/or reduced version of the digital information signal. For example, where the digital information signal includes a digital still image or digital video signal, the first share notification signal 312 may include a "thumbnail" image having a reduced size and/or quality. Where the digital information signal includes an audio signal, the first share notification signal 312 may include shortened "clip" from the audio signal having a reduced size and/or quality.

Additionally, the first share notification signal 312 may include information regarding options for retrieving the digital information signal. For example, the share notification signal 312 may indicate that the stored digital information signal is available for retrieval in a high, medium or low quality format as discussed above in connection with the embodiments of FIG. 2.

Returning to FIG. 3, intermediary 305 generates a second share notification signal 316 which may include the information in the first share notification signal 312. In addition, the second share notification signal 316 may include additional information to assist the user of the receiving wireless terminal 304 to determine whether or not to retrieve the stored digital information signal. For example, the intermediary 305 could calculate (or obtain from a billing server in the MTSO) an estimated cost associated with retrieving the digital information signal and include the estimated cost in the second share notification signal 316. Accordingly, in some embodiments of the invention, a user of a receiving wireless terminal 304 could make a determination of whether or not to retrieve a digital information signal based at least in part on the cost associated with such retrieval.

Upon receiving the second share notification signal 316 from the intermediary 305, the receiving wireless terminal 304 may display a notification message 318 to the user indicating that the digital information signal is available for retrieval (block 318).

If the user of the receiving wireless terminal 304 decides to retrieve the digital information signal, an appropriate command is given to the receiving wireless communication terminal (e.g. via an appropriate keypress or menu selection) and the receiving wireless terminal 304 responsively sends a first request signal 320 to the intermediary 305 identifying the desired digital information signal and requesting to receive the digital information signal. The first request signal 320 may specify formatting options for the digital information signal.

While not illustrated in FIG. 3, in some embodiments, the first request signal 320 may be provided directly to the originating wireless terminal 302. However, under certain circumstances, it may be preferable for the receiving wireless terminal 304 to send the first request signal 320 to the intermediary 305. For example, when the receiving wireless terminal 304 is ready to send the first request signal 320, the originating wireless terminal 302 may be switched off or otherwise unavailable for communication. If the first request signal 320 is instead provided to the intermediary 305 while the originating wireless terminal 302 is unavailable for communication, the intermediary may store the first request signal 320 until the originating wireless terminal 302 is once again available for communication.

As discussed above, the first and second request signals 320, 322 may include information responsive to options provided in the share notification signal. For example, the request signal may indicate the desired quality of the signal (low, medium or high), and any other retrieval options designated or supported by the originating wireless terminal 302.

In response to the first and/or second request signal 320, 322, the originating wireless terminal 302 may process the digital information signal in the format and/or with the options requested by the receiving wireless terminal 304 in the first and/or second request signal 320, 322 to provide a formatted digital information signal and send the formatted digital information signal 324 to the receiving wireless terminal 304. The receiving wireless terminal 304 may then display and/or play the signal for the user (block 326).

Referring to FIG. 4, further embodiments according to the invention are illustrated as system 400. In the system 400, the intermediary 405 is configured to receive an unformatted or partially formatted digital information signal from the originating wireless terminal and process the unformatted or partially formatted digital information signal to provide a processed digital information signal that is formatted according to options and/or preferences requested by the receiving wireless terminal 404. Accordingly, as illustrated in FIG. 4, a system 400 initially operates similar to the system 300 illustrated in FIG. 3. In particular, an originating wireless terminal 402 stores a digital information signal (block 410). After receiving a distribution command (block 411), the originating wireless terminal 402 sends an appropriate first share notification signal 412 to the intermediary 405. The first share notification signal 412 may specify one or more receiving wireless terminals 404. The intermediary subsequently sends a second share notification signal 416 to the receiving wireless terminals 404 specified in the first share notification signal 412 sent by the originating wireless terminal 402.

The second share notification signal 416 may include information regarding options for retrieving the digital information signal. For example, the second share notification signal 416 may indicate that the stored digital information signal is available for retrieval in a high, medium or low quality format as discussed above in connection with the embodiments of FIGS. 2 and 3. Since the processing of the digital information signal may be performed according to some embodiments by the intermediary 405, the second share notification signal 416 sent from the intermediary 405 to the receiving wireless terminal 404 may include additional and/or different options than may be specified by the originating wireless terminal 402. For example, the intermediary 405 may be capable of processing the digital information signal in ways that the originating wireless terminal 402 is not capable of doing within an acceptable amount of time.

If the user of the receiving wireless terminal 404 decides to retrieve the digital information signal, a first request 420 is sent to the intermediary 405. As above, the first request 420 may specify a format and/or other options for retrieving the digital information signal. The intermediary 405 may then send a second request 422 to the originating wireless terminal 402, which responsively sends the unformatted or partially formatted digital information signal 424 to the intermediary 405. The intermediary 405 processes the unformatted or partially formatted digital information signal 424 in the format and/or with the options requested by the receiving wireless terminal 404 in the request signal (block 425) to provide a formatted digital information signal, and sends the formatted digital information signal 426 to the receiving wireless terminal 404. The receiving wireless terminal 404 may then display and/or play the signal for the user (block 428).

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of sharing digital information in a wireless communication network including first and second wireless communication terminals and an intermediary, the method comprising:

receiving at the intermediary a first notification signal from the first wireless communication terminal, the first notification signal indicating availability of a digital information signal with available format options and including an address of the second wireless communication terminal, wherein the first notification signal comprises a truncated and/or reduced version of the digital information signal;

responsive to the first notification signal from the first wireless communication terminal, sending a second notification signal from the intermediary to the second wireless communication terminal indicating availability of the digital information signal;

receiving at the intermediary a first request signal indicating a requested format from the second wireless communication terminal, after sending the first notification signal;

processing the digital information signal at the intermediary pursuant to a selected formatting option specified in the first request signal; and responsive to receiving the first request signal, sending a second request signal from the intermediary to the first wireless communication terminal requesting the first wireless communication terminal to send the digital information signal, wherein sending the second notification signal comprises sending the truncated and/or reduced version of the digital information signal to the second wireless communication terminal along with the second notification signal before a user of the second wireless communication terminal sends the first request signal.

2. The method of claim 1, wherein the method further includes displaying/playing the truncated and/or reduced version of the digital information signal at the second wireless terminal.

3. The method of claim 1, wherein the first notification signal comprises an option for formatting the digital information signal.

4. The method of claim 1, wherein the second notification signal includes an option for formatting the digital information signal.

5. The method of claim 1, wherein the first request signal contains a selected option for formatting the digital information signal.

6. The method of claim 1, further comprising receiving the digital information signal from the first wireless communication terminal at the intermediary; and sending the digital information signal from the intermediary to the second wireless communication terminal.

7. The method of claim 6, further comprising processing the digital information signal at the intermediary pursuant to a selected formatting option specified in the first request signal, and wherein sending the digital information signal to the second wireless communication terminal includes sending a formatted digital information signal from the intermediary to the second wireless communication terminal.

* * * * *

UNITED STATES PATENT AND TRADEMARK OFFICE
CERTIFICATE OF CORRECTION

PATENT NO. : 8,874,166 B2  
APPLICATION NO. : 14/284102  
DATED : October 28, 2014  
INVENTOR(S) : Thoresson Page 1 of 1

It is certified that error appears in the above-identified patent and that said Letters Patent is hereby corrected as shown below:

In the Claims:
Column 12, Claim 1, Line 21: Please correct "terminal alonq with"
to read -- terminal along with --

Signed and Sealed this
Third Day of March, 2015

Michelle K. Lee
*Deputy Director of the United States Patent and Trademark Office*